(12) United States Patent
Sheng et al.

(10) Patent No.: US 9,338,455 B1
(45) Date of Patent: May 10, 2016

(54) ADAPTIVE COMPRESSION ARTIFACTS REDUCTION METHOD

(71) Applicant: Pixelworks, Inc., Portland, OR (US)

(72) Inventors: Xiaojie Sheng, Shanghai (CN); Neil Woodall, Newport Beach, CA (US); Bob Zhang, Santa Clara, CA (US); Guohua Cheng, Shanghai (CN)

(73) Assignee: PIXELWORKS, INC., Portland, OR (US)

(*) Notice: Subject to any disclaimer, the term of this patent is extended or adjusted under 35 U.S.C. 154(b) by 386 days.

(21) Appl. No.: 13/918,405

(22) Filed: Jun. 14, 2013

Related U.S. Application Data

(63) Continuation of application No. 13/747,849, filed on Jan. 23, 2013, now abandoned.

(51) Int. Cl.
*H04N 19/00* (2014.01)
*H04N 19/86* (2014.01)

(52) U.S. Cl.
CPC .............................. *H04N 19/00909* (2013.01)

(58) Field of Classification Search
USPC ................................. 382/254, 233, 275
See application file for complete search history.

(56) References Cited

U.S. PATENT DOCUMENTS

| | | | | |
|---|---|---|---|---|
| 6,466,625 B1* | 10/2002 | Kobayashi | ........... | H04N 9/8042 |
| | | | | 375/240.25 |
| 7,680,355 B2* | 3/2010 | Chiu | .................... | H04N 19/176 |
| | | | | 345/611 |
| 8,073,276 B2* | 12/2011 | Zhong | .................... | G06T 5/002 |
| | | | | 382/166 |
| 8,194,757 B2* | 6/2012 | Schoner | ................. | G06T 5/002 |
| | | | | 375/240.2 |
| 8,195,002 B2* | 6/2012 | Osamoto | ................. | G06T 5/002 |
| | | | | 345/611 |
| 8,571,347 B2* | 10/2013 | Srinivasan | .............. | G06T 5/003 |
| | | | | 375/240.25 |

* cited by examiner

*Primary Examiner* — Ishrat I Sherali
(74) *Attorney, Agent, or Firm* — Marger Johnson (57) ABSTRACT

A method of reducing artifacts in video image data includes determining pixels in a block of image data that are mosquito pixels, estimating a level of mosquito noise in the block, and filtering out the mosquito noise to produce noise-filtered data.

14 Claims, 8 Drawing Sheets

ADAPTIVE COMPRESSION ARTIFACTS REDUCTION METHOD

CROSS REFERENCE TO RELATED APPLICATION

This application is a continuation of, and claims priority to, U.S. patent application Ser. No. 13/747,849, filed Jan. 23, 2013, which in incorporated herein in its entirety.

BACKGROUND

Lossy video compression standards will lead to noise artifacts. A lossy compression standard compresses a digital video stream by discarding some of the video data. Two possible noise artifacts are 'mosquito noise' and blockness.

Mosquito noise manifests itself as ringing or distortions around the edges of items in the image that appear to be shimmering or blurring of dots. The dots resemble mosquitoes swarming around the object, resulting in the naming of the artifact. One current approach involves a one-step de-mosquito process that requires a manual threshold setting to get the correct trade-off between reduction of the artifacts and detail protection. This generally results in less than optimal reduction of mosquito artifacts.

Blockness generally results from the reconstruction of data that has lost even more information. As the pixels for each block are reconstructed, the interior of the block is smooth, but the edges of the blocks do not match the surrounding blocks. One approach uses a filter based de-blocking process to smooth the boundary between blocks. However, filter based de-blocking is not necessarily adaptive enough and may have higher costs than is desirable.

The ability to perform both adaptive and more accurate de-blocking and de-mosquito at a lower cost would be useful.

DETAILED DESCRIPTION OF THE EMBODIMENTS

Figure 1:
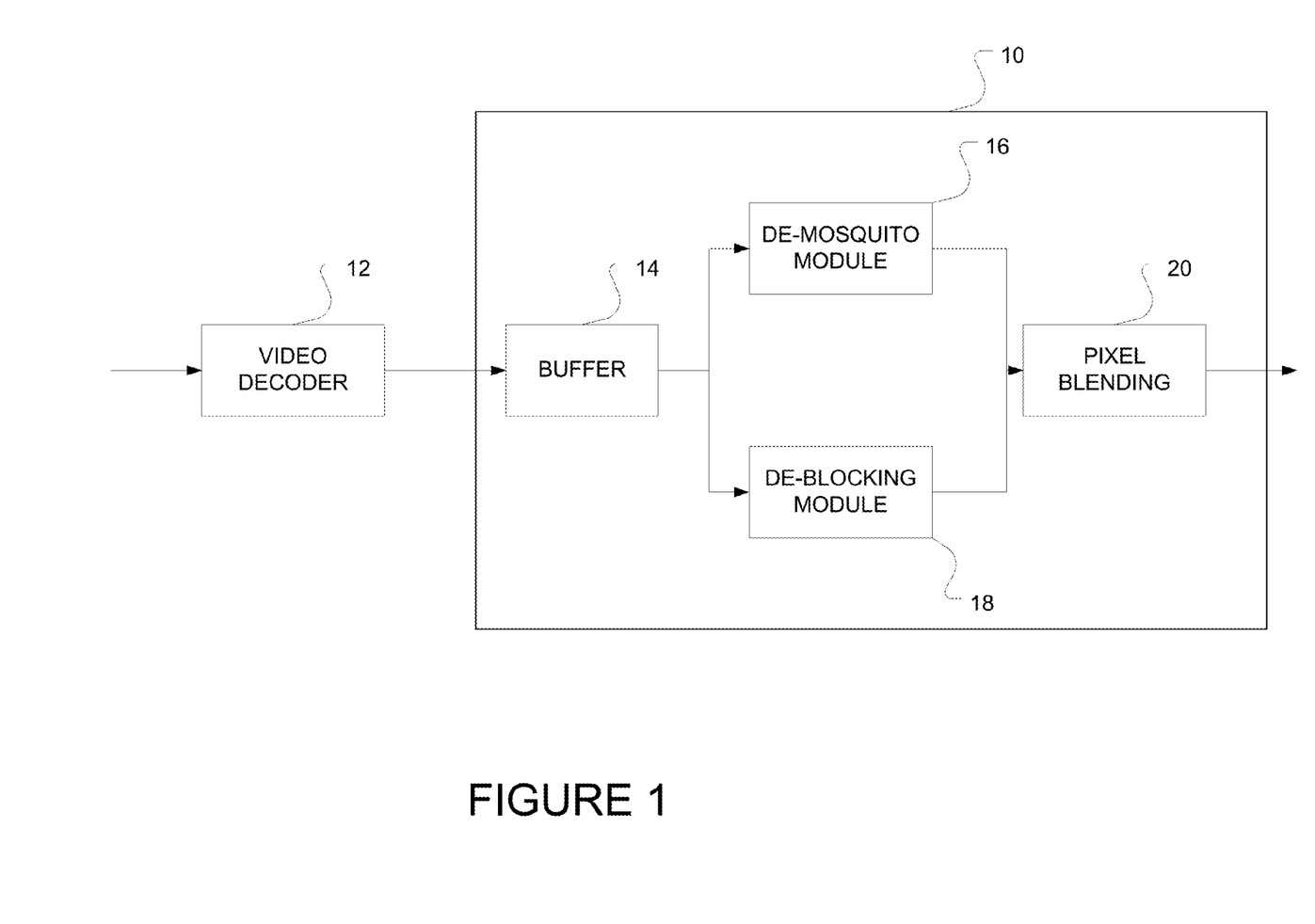
FIG. 1 shows an embodiment of an image processing system.

FIG. 1 shows an embodiment of a portion of an image processor 10. The incoming video data is decoded by video decoder 12 and sent to the image processor 10. The image processor 10 may include the buffer 14, or the buffer 14 may be separate from the processor. The buffer 14 may take one of many forms. In one embodiment, the buffer 14 may consist of several line delays shared by both blocks. Some embodiments may employ a separate sets of line delays and the de-mosquito and de-block modules could run in series. However, to save money and space, a single set of line delays may be used to allow the modules to run in parallel.

In general, the de-mosquito module 16 employs two steps. First, the process determines which pixels are typical mosquito pixels in a block through a set of strict parameters. Using these typical mosquito pixels, the mosquito noise level in the block is estimated. Finally, using these estimated parameters, the process adaptively adjusts the weights of a filter to eliminate the mosquito while at the same time protecting the image detail.

In addition to the de-mosquito process, an adaptive shift based de-blocking module 18 is applied to the data to remove the blockness. Typical unblocking or de-blocking processes rely on filters. However, the embodiments in here employ an adaptive shifting process, as will be discussed in more detail later. The results of the de-mosquito process and the de-blocking process are then blended at the pixel blending module 20 to generate the final output.

Figure 2:
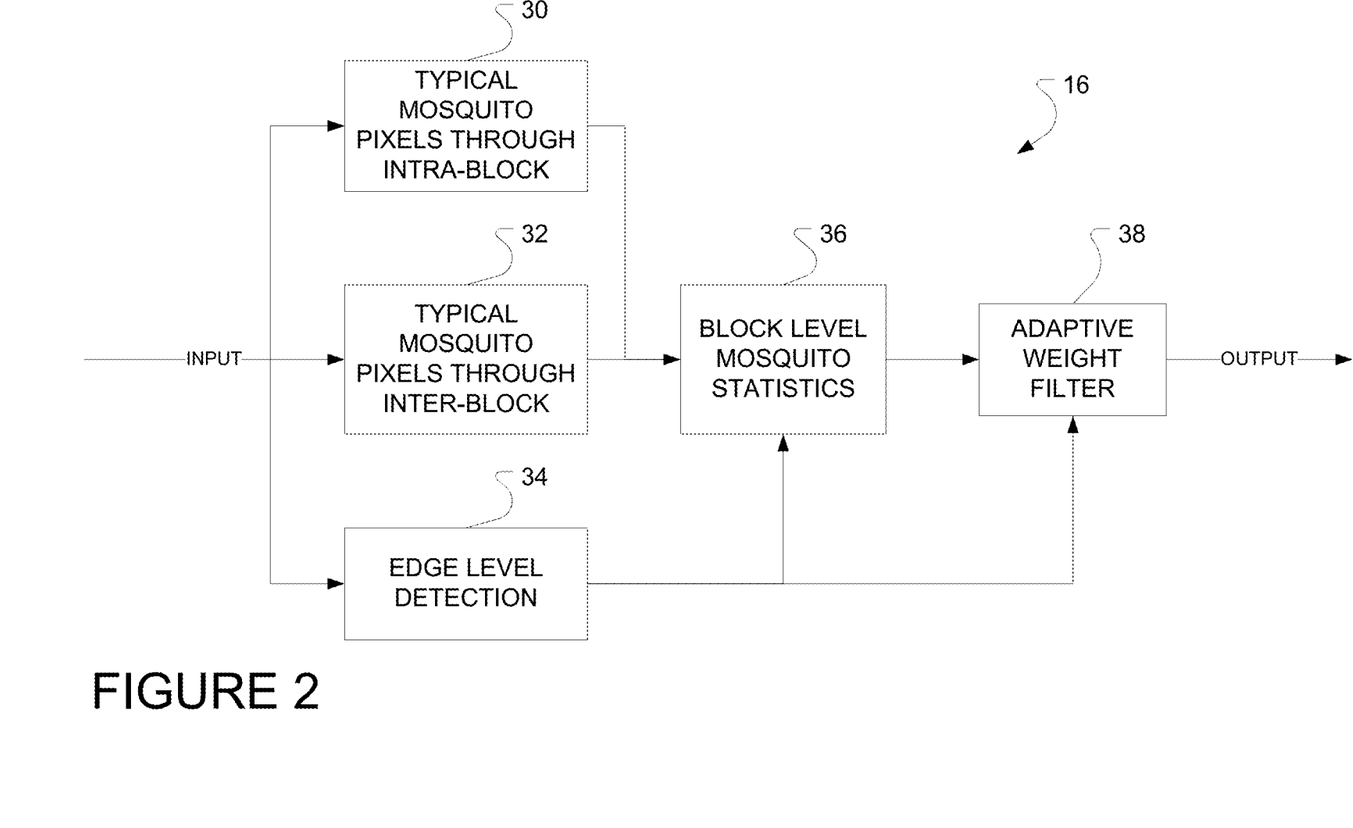
FIG. 2 shows an embodiment of a de-mosquito module.

FIG. 2 illustrates the main portions in the de-mosquito module 16. The module finds typical mosquito pixels using intra-block information at 30. The module also finds typical mosquito pixels using inter-block information at 32. The module also generates the edge strength of each pixel at 34. The block level mosquito statistics module 36 calculates two important block level mosquito statistics based on the intra-block, inter-block and edge level information. Finally, the adaptive weight filter 38 applies an adaptive weight filter based on the statistics estimated in module 36 to generate the output data.

Now looking in more detail at the individual portions of the de-mosquito modules, the discussion turns to the intra-block module 30. To do 8×8 block level de-mosquito, one embodiment uses a 10×10 block of information to do a 3×3 average filter. For each pixel in the block, the process uses two per pixel values. First, the pixel's original value is denoted as $P_{i,j}$ for $i,j=[1, 8]$ for an 8×8 block. The second value is calculated by doing an average filter in 3*3 neighbors of the original pixel and is denoted as $A_{i,j}$ for $i,j=[1,8]$ for an 8×8 block. Then the maximum and minimum value of $P_{i,j}$ and $A_{i,j}$ in the block is calculated as:

$$P\_min = \min(P_{i,j})\ i,j=[1,8]$$

$$P\_max = \max(P_{i,j})\ i,j=[1,8]$$

$$A\_min = \min(A_{i,j})\ i,j=[1,8]$$

$$A\_max = \max(A_{i,j})\ i,j=[1,8].$$

The filter could also be a rank order filter, a median filter or a low pass filter.

Figure 3:
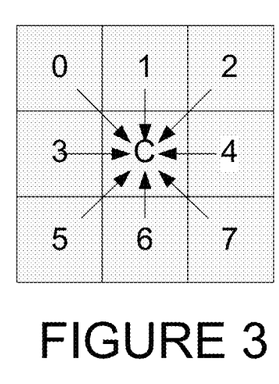
FIG. 3 shows a graphic of intra-block information.

Then process then applies the following criteria to determine if a pixel is considered a typical mosquito pixel:

(1) the maximum difference between $A_{i,j}$ value of the pixel and $A_{i,j}$ value of its eight surrounding pixels in 3*3 neighbors is below a certain threshold $THR1=[A\_max-A\_min]/gain\_1$; and (2) the maximum difference between $P_{i,j}$ value of the pixel and $P_{i,j}$ value of its eight surrounding pixels in 3*3 neighbors is below a certain threshold $THR2=[P\_max-P\_min]/gain\_2$. The gain_1 and gain_2 is defined to control the threshold. For example, a typical setting can be: gain_1=16, gain_2=5. The surrounding eight pixels are illustrated in FIG. 3. If a pixel meets both the above criteria, the pixel is considered a typical mosquito pixel and the process sets the flag $TMF_{i,j}$ for that pixel to 1. Otherwise, the flag is set to 0.

Figure 4:
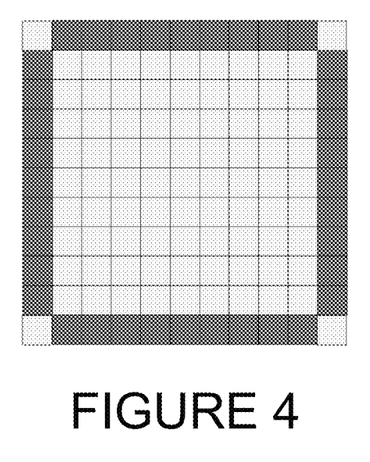
FIG. 4 shows a graphic of inter-block information.

The inter-block mosquito module 32 will further find typical mosquito pixels as a supplement to the module 30. For some video contents with high compression rate, intra-block information is not enough to find the typical mosquito pixels. But the pixels near the current block are sometimes very helpful and can provide inter-block information to find typical mosquito pixels. As illustrated in FIG. 4 the process will collect information from four 1*8 lines which belong to neighboring blocks as inter-block information. The process denotes the four 1×8 lines as Ln for n=[1,4]. It also denotes the original pixel value of the 8 pixels in Ln as Pi_n for i=[1,8] n=[1,4]. The pixel value of the four blue lines are separately checked and three values are calculated for each 8 pixel line segment Ln:

the maximum $Pi\_n$ value for $Ln$: $Pn\_max = max(Pi\_n)$
$i=[1,8]$;

the minimum $Pi\_n$ value for $Ln$: $Pn\_min = min(Pi\_n)$
$i=[1,8]$; and the average $Pi\_n$ value for $Ln$: $Pn\_ave = sum(Pi\_n)/8$
$i=[1,8]$.

The process then checks each pixel in the 8*8 block with TMFi,j=0. And if the following two criteria are met for any n=[1,4], the process then sets the TMFi,j of the pixel to 1:

$Pn\_max - Pn\_min < THR\_\epsilon$; and all the difference between the nine Ai,j values of 3*3 neighbors of the pixel and the Pn_ave are below a threshold 2*THR_ϵ.

The THR_ϵ represent a very small gray level difference between two pixels which the human eye can hardly recognize. In one embodiment, the THR_ϵ is set to be 4.

Figure 5:
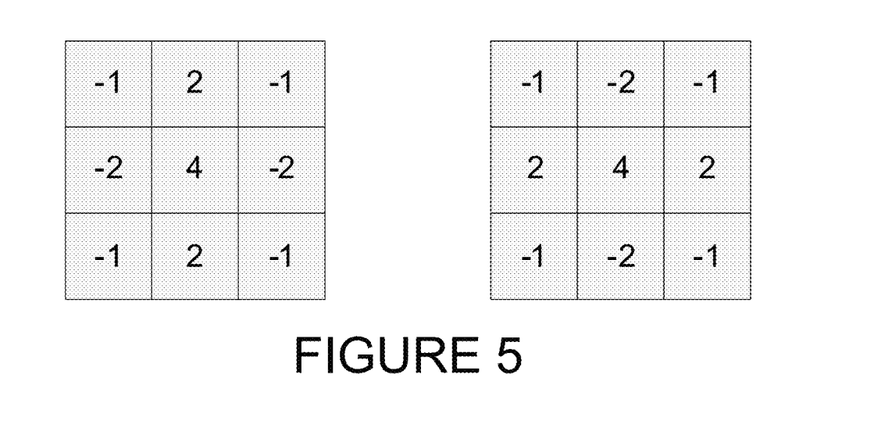
FIG. 5 shows a graphic of edge detection.

Returning to FIG. 2, the edge detection module 34 detects the edge level of each pixel to protect vertical or horizontal edges. The edge level is detected using vertical and horizontal gradient value. The horizontal and vertical gradient value is calculated by the template for Pi,j values of 3*3 neighbors of that pixel illustrated in FIG. 5. The calculated horizontal and vertical gradient is denoted as Grad_x and Grad_y. For a pixel, the process uses NEF (NotEdgeFlag) to represent the pixel belongs to an edge or not. If Grad_x>2*Grad_y or Grad_y>2*Grad_x. If the flag NEF=0, the pixel belongs to an edge. Otherwise, NEF=1, the pixel does not belong to an edge.

After the processes of 30, 32 and 34, there are two flags for each pixel in a block and they represent:

TMF=1: The pixel is a typical mosquito pixel
TMF=0: The pixel is not a typical mosquito pixel
NEF=1: The pixel does not belong to an edge
NEF=0: The pixel belongs to an edge The two flags are used to calculate the RMS value of the block level mosquito statistics. The flags are used to determine which pixels are included in the block level mosquito statistics parameters: Num and Sigma. The Num represents the total number of typical mosquito pixels in a block. The Sigma represents the total amount of mosquito noise in the block. The Num and Sigma are calculated as follows:

The process first initializes the Num and Sigma value to 0. The process then accumulate the Num and Sigma value by:

Num=sum($TMFi,j*NEFi,j$) $i,j=[1,8]$

Sigma=sum(($Pi,j-Ai,j$)$^2$*$TMFi,j*NEFi,j$) $i,j=[1,8]$

In which the Pi,j and Ai,j is the original value of the pixel. Ai,j is the 3*3 average filtered value of that pixel.

After all the pixels in the block are processed, the RMS value is calculated by:

RMS=Sqrt(Sigma/Num)

It should be noted that similar statistics or approximations to the RMS value, such as SAD can be used depending on the cost and performance requirements of the circuit.

After acquiring the block level mosquito statistics, such as by a process as that described above. The process can filter the pixels using an adaptive weight filter. In one embodiment, a 3*3 adaptive weight filter is applied to every pixel in the block to eliminate the mosquito noise. This filter example is merely for discussion and is not intended to limit the scope of the embodiment.

Figure 6:
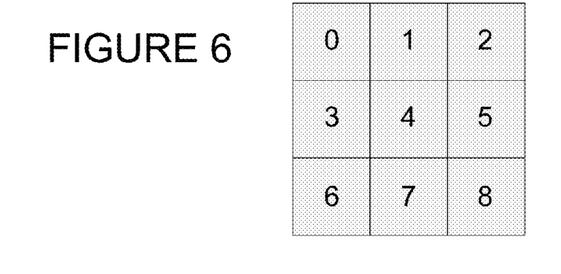
FIG. 6 shows an embodiment of a 3×3 adaptive weight filter.

As illustrated in FIG. 6, to filter the pixel at position 4, one gets the Pi,j value of all the 3*3 neighboring pixels and denote them as Pi,j_n, in which n represents the position of that pixel. The process then calculates the weight for each pixel. In general, the weights can be any monotonic function. The embodiment below uses a piece wise S curve:

weight=max(THR_min,min(THR_max,$K*RMS/abs(P(i)\_n-P(i)\_4)$)).

For hardware cost consideration, it can allocate some integer values for possible W_n and design a look up table to calculate each value. For example, one can allocate three possible values for W_n and calculate it as following:

$W\_n=4$ when $abs(Pi,j\_n-Pi,j\_4) \in [0, K1*RMS]$ $W\_n=2$ when $abs(Pi,j\_n-Pi,j\_4) \in (K1*RMS, K2*RMS]$ $W\_n=1$ when $abs(Pi,j\_n-Pi,j\_4) \in (K2*RMS, K3*RMS]$.

In which K1, K2 and K3 are parameters to tune the W_n, and RMS is the block mosquito statistics calculated previously. Through this method W_n can be calculated through simple comparison. Also, the W_n*Pi, j_n calculation in following formula can also be simply calculated by shifting the data. Certainly, one can allocate more possible values for W_n and design more complex piecewise function to get a better tradeoff between cost and performance. The formula means when the pixel value of 3*3 neighbors is close to the central pixel compared to the RMS value, the weight will be large. Otherwise the weigh will be small.

After the process gets each weight for all 3*3 neighbors, the final filtered pixel for Pi,j_4 is:

$$FPi, j\_4 = \sum_{n=0}^{8}(W\_n * Pi, j\_n) \bigg/ \sum_{n=0}^{8} W\_n$$

W_n is the calculated weight for pixel at position n, and FPi,j_4 is the filtered results for central pixel.

Finally the filtered result is blended with original one considering the typical mosquito number in a block. More typical mosquito number means more stable the RMS value and one should trust the filtered results more. The blending is done as follows:

If Num>THR_H $P\_DMi,j\_4 = FPi,j\_4$

Else If Num<THR_L $P\_DMi,j\_4 = Pi,j\_4$ otherwise $P\_DMi,j\_4 = [(THR\_H-Num)*Pi,j\_4 + (Num-THR\_L)*FPi,j\_4]/(THR\_H-THR\_L)$.

P_DMi,j_4 is the final de-mosquito output of the central pixel. THR_L and THR_H are two truncated thresholds to control the blending. If the typical mosquito number Num is larger than THR_H, the FPi,j_4 is used as final output. Otherwise if Num is smaller than THR_L, the process takes the original pixel value Pi,j_4 as output. Otherwise, the de-mosquito output is the linear blending of the FPi,j_4 and Pi,j_4 values. The resulting output will be sent to the global pixel blending module 20 in FIG. 1.

Figure 7:
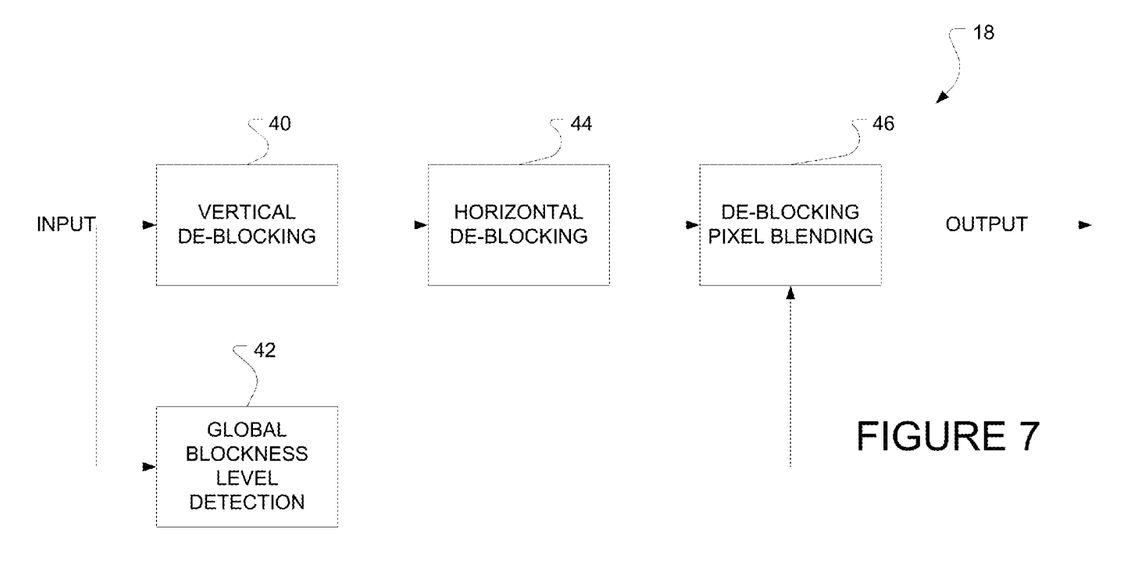
FIG. 7 shows an embodiment of a de-blocking module.

FIG. 1 also shows the de-blocking module 18, which is shown in more detail in FIG. 7. The module for global blockness level detection 42 operates on the input data. The vertical de-blocking module also operates on the input data. The horizontal de-blocking module 44 operates on the output of the vertical de-blocking module in this embodiment, but this is merely for discussion purposes. The order can also be reversed. The module 46 operates on the vertically and horizontally de-blocked data and blends it according to the global blackness detection. Each portion of this overall process will be discussed in more detail.

Figure 8:
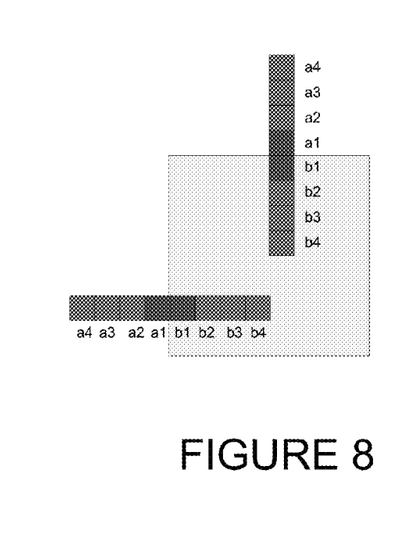
FIG. 8 shows an example of pixels used in global blackness detection.

In module 42, the frame blockness level is detected and represented by two parameters. As illustrated in FIG. 8, for each vertical or horizontal block boundary, the embodiments check eight pixels, although different numbers of pixels may be selected depending upon the application, compression standard, and system resources. Several values are then calculated:

$$D\_border = abs(a1-b1)$$

$$D\_2 = \max(abs(a1-a2), abs(a2-a3), abs(a3-a4))$$

$$D\_3 = \max(abs(b1-b2), abs(b2-b3), abs(b3-b4))$$

$$D\_\max = \max(D\_2, D\_3)$$

$$D\_diff = D\_border - D\_\max - THR\_blk$$

In which, THR_blk is a threshold to control the blockness level. Typically, THR_blk is set to 0.

Figure 9:
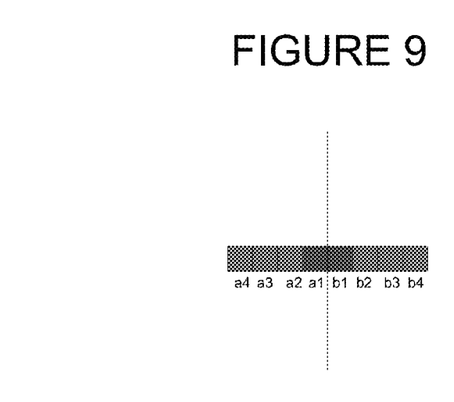
FIG. 9 shows an example of pixels used in vertical block boundaries.

The process then defines three variables to accumulate the global statistics: Num_all; Num_blk; and Sigma_blk. Every time the process checks a vertical or horizontal 1*8 line near the block boundary as shown in FIG. 9, it accumulates the three variables as:

(1) Num_all=Num_all+1

(2) If $D\_diff>0$ Num_blk=Num_blk+1

Else Num_blk=Num_blk+0

(3) If $D\_diff>0$ Sigma_blk=Sigma_blk+ D_diff*D_diff

Else Sigma_blk=Sigma_blk+0.

After all the block boundaries in a frame have been processed, the process defines two global blockness statistics as:

Ratio_blk=Num_blk/Num_all

RMS_blk=sqrt(Sigma_blk/Num_blk).

Module 40 performs vertical de-blocking. As illustrated in FIG. 9, for a vertical block boundary, the process checks the 1*8 pixels. The process then calculate the D_diff value in the same way as described with regard to the vertical blocking process, and similar statistics are then accumulated.

As mentioned previously, the adaptive filter used here is a shifting filter, so the process then simply shifts the 8 pixels to do de-blocking by:

If $(a1>=b1)$ Flag=1

Else Flag=−1 a1=a1−Flag*D_diff/2 a2=a2−Flag*D_diff/4 a3=a3−Flag*D_diff/8 a4=a4−Flag*D_diff/16 b1=b1+Flag*D_diff/2 b2=b2+Flag*D_diff/4 b3=b3+Flag*D_diff/8 b4=b4+Flag*D_diff/16.

Figure 10:
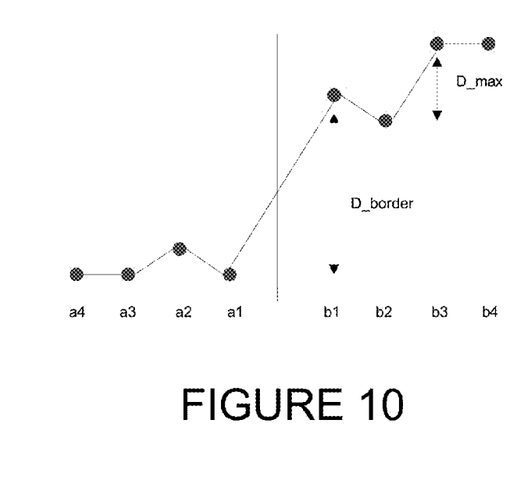
FIGS. 10 and 11 show examples of original values of pixels and their de-blocking results.
Figure 11:
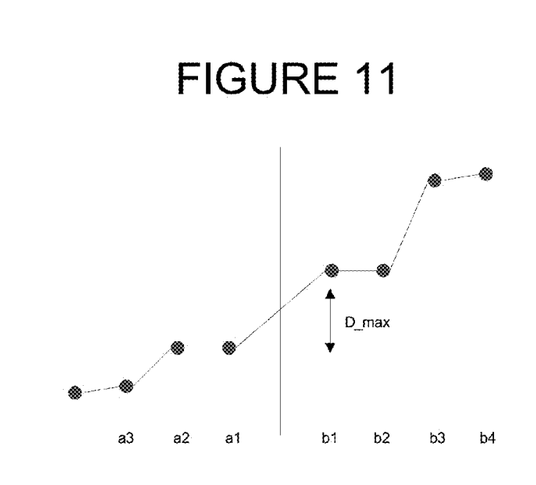
Figure 12:
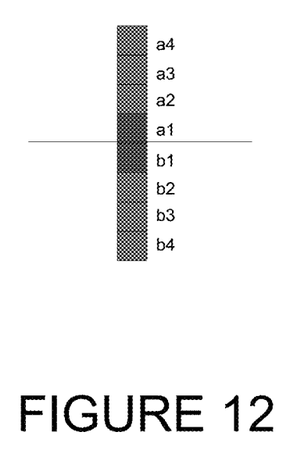
FIG. 12 shows an example of pixels used in horizontal de-blocking.

FIGS. 10 and 11 illustrate an example of the original value of the 8 pixel and their de-blocking results. Through the shift, the boundary effect is reduced and at same time, the image detail is also preserved.

After the shift operation of the 8 pixels, the process will further do blending operations at 46 according to global statistics RMS_blk from 42. Larger RMS_blk values mean higher levels of blockness level in the whole image and smaller values mean lower blockness levels. The global blockness level will influence the de-blocking results by:

If $D\_diff > k1*RMS\_blk$ $P\_DB=P\_init$

Else if $D\_diff < k2*RMS\_blk$ $P\_DB=P\_DB$

Else $P\_DB=[(k1*RMS\_blk-D\_diff)*P\_DB+(D\_diff-k2*RMS\_blk)*P\_init]/(k1*RMS\_blk-k2*RMS\_blk)$ In which P_DB is the shifted pixel value and P_init is the original pixel value. K1 and k2 are two register to control the blending level and k1>k2.

The module 46 will blend the pixel value after horizontal and vertical de-blocking with the pixel's original value according to global statistics calculated in module 42. In real video de-blocking application, the global statistics calculated in a current frame is used in de-blocking of next frame.

The blending is done according to Ratio_blk. The pixel value after vertical and horizontal de-blocking is P_DB and the initial pixel value is P_init. The blending is as follows:

If Ratio_blk>THR_Rat_H $P\_DB=P\_DB$

Else If Ratio_blk<THR_Rat_L $P\_DB=P\_init$

Else $P\_DB=[(THR\_Rat\_H-Ratio\_blk)*P\_init+(Ratio\_blk-THR\_Rat\_L)*P\_init]/(THR\_Rat\_H-THR\_Rat\_L)$ In which THR_Rat_H and THR_Rat_L are two registers to control the blending level and THR_Rat_H>THR_Rat_L. The output of the module 18 is then used in the overall process of FIG. 1.

Returning to FIG. 1, module 20 blends the de-mosquito and de-blocking results and generates the final output. The output of module 16 for a pixel is P_DM and the output of module 18 is P_DB. The initial value of the pixel is P_init. The final output of module 20 is P_out. The blending is done as follows:

Delta_DM=P_DM−P_init

Delta_DB=P_DB−P_init

If(sign(Delta_*DM*)*sign(Delta_*DB*)<0)

P_out=Delta_*DM*+Delta_*DB*+P_init else if(*abs(DB−P*_init)>*abs(DM−P*_init))

P_out=P_DB;

else

P_out=P_DM.

The resulting output pixel has undergone a de-mosquito process and a de-blocking process that result in fewer artifacts in the final image. Further, the de-mosquito and de-blocking modules use the same line delays or buffers, reducing the cost of the system. The resulting data is then further processed by the image processor and ultimately displayed to the viewer.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of reducing artifacts in video image data, comprising:
    determining pixels in a block of image data that are mosquito pixels;
    de-blocking the image data horizontally and vertically to produce de-blocked data by shifting values of pixels based on an edge magnitude between the block and adjacent blocks and a position of pixels in the block;
    estimating a level of mosquito noise in the block;
    filtering out the mosquito noise to produce noise-filtered data;
    blending the de-blocked and noise-filtered data to produce output image data.

2. The method of claim 1, wherein applying the de-mosquito process comprises determining typical mosquito pixels in the block using intra-block information.

3. The method of claim 2, wherein applying the de-mosquito process comprises determining typical mosquito pixels in the block using inter-block information.

4. The method of claim 3, wherein applying the de-mosquito process comprises generating an edge strength for each pixel in the block.

5. The method of claim 4, wherein the method further comprising setting a mosquito flag for each pixel in the block indicating whether the pixel is a mosquito pixel or not a mosquito pixel.

6. The method of claim 5, wherein the method further comprising setting an edge flag for each pixel in the block indicating whether the pixel is an edge pixel or not an edge pixel.

7. The method of claim 6, further comprising filtering each pixel in the block using the edge flags and mosquito flags for the block.

8. The method of claim 1, wherein adjacent blocks are determined by one of a row or column of a pixel within the block to which de-blocking is being applied.

9. The method of claim 1, wherein de-blocking the image data comprises:
    detecting a frame blockness level for a block in the original image data;
    horizontally de-blocking the image data to produce horizontally de-blocked image data;
    vertically de-blocking the image data to produce vertically de-blocked image data; and
    blending the de-blocked image data with the image data according to the frame blackness level.

10. The method of claim 9, wherein horizontally de-blocking the image data comprises horizontally de-blocking vertically de-blocked image data.

11. The method of claim 9, wherein vertically de-blocking the image data comprises vertically de-blocking horizontally de-blocked image data.

12. An image processor, comprising:
    at least one buffer arranged to receive a decoded video signal from a decoder;
    a de-mosquito module configured to:
        determine typical mosquito pixels in a block of image data in the decoded video signal stored in the buffer;
        estimate a mosquito noise level; and
        filter the image data based upon the mosquito noise level to produce noise-filtered image data;
    a de-blocking module configured to:
        de-block the image data horizontally and vertically to produce de-blocked data by shifting values of pixels based on an edge magnitude between the block and adjacent blocks and a position of pixels in the block; and
    a blending module the de-blocked and noise-filtered data to produce output image data.

13. The image process of claim 12, wherein the de-blocking module and the de-mosquito module share the buffer.

14. The image processor of claim 12, wherein the at least one buffer comprises multiple line delays.

* * * * *